United States Patent [19]

Hoehn

[11] Patent Number: 4,567,979

[45] Date of Patent: Feb. 4, 1986

[54] CAM FOLLOWER ASSEMBLY FOR INDEXING CONVEYORS

[76] Inventor: Robert A. Hoehn, 9230 E. 47th St., Kansas City, Mo. 64133

[21] Appl. No.: 657,077

[22] Filed: Oct. 2, 1984

[51] Int. Cl.[4] .................... B65G 25/04; B61B 13/00
[52] U.S. Cl. .................... 198/750; 74/89.15; 104/167; 198/747
[58] Field of Search .............. 104/166, 167, 165; 198/472, 473; 74/89.15, 441; 198/750, 747

[56] References Cited

U.S. PATENT DOCUMENTS

| | | | |
|---|---|---|---|
| 3,331,257 | 7/1967 | Gerber | 74/441 |
| 3,842,961 | 10/1974 | Burson | 104/172 R |
| 4,322,987 | 4/1982 | Gartner | 74/89.15 |
| 4,440,038 | 4/1984 | Potter | 74/89.15 |

FOREIGN PATENT DOCUMENTS 2138011 8/1970 Fed. Rep. of Germany ..... 74/89.15

*Primary Examiner*—Robert B. Reeves
*Assistant Examiner*—Donald T. Hajec

*Attorney, Agent, or Firm*—D. A. N. Chase; Michael Yakimo, Jr.

[57] ABSTRACT

In an indexing conveyor that employs a helically grooved drive shaft to propel a shuttle carriage that is, in turn, coupled with a product-bearing dolly, the carriage is provided with a drive connection assembly comprising a pair of follower rollers that are received within the drive shaft groove. The rollers are carried by a swivel bar on opposite sides of its axis, which is perpendicular to the axis of rotation of the drive shaft. The assembly further includes a spring that biases the swivel bar in one direction so as to maintain the followers in engagement with the leading and trailing surfaces respectively of the shaft within the groove when the shaft is at rest or rotating at constant speed. Under rapid acceleration or deceleration of the drive shaft, pivotal movement in the opposite direction against the action of the spring causes both followers to engage the trailing surface during acceleration and the leading surface during deceleration. Impact loading in the drive connection is thereby eliminated and precise positioning of the product-bearing dolly is assured.

6 Claims, 7 Drawing Figures

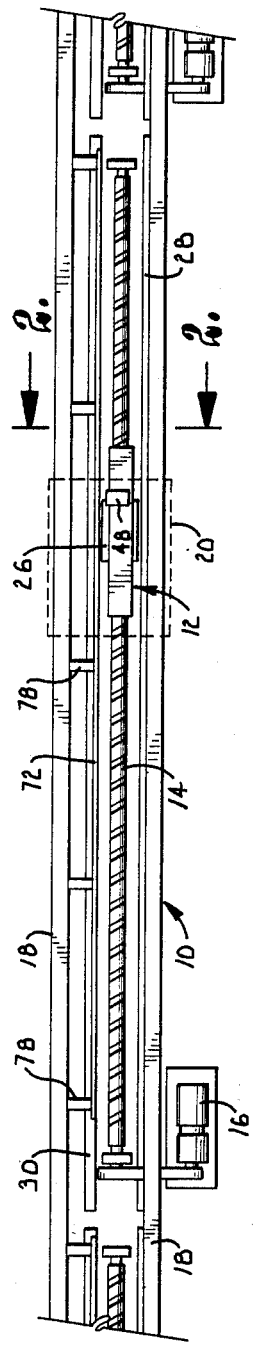
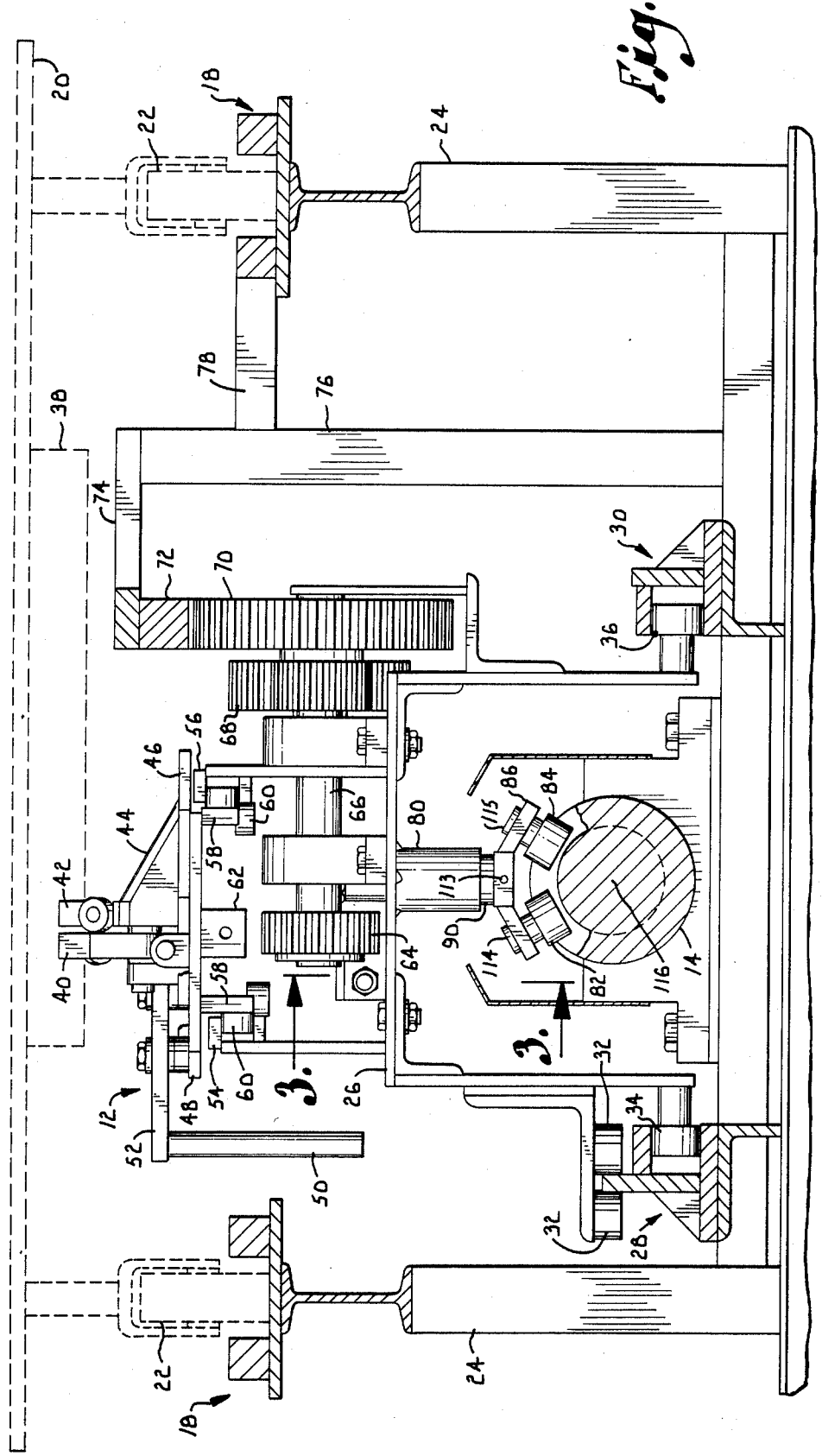
Fig. 1.
Fig. 2.

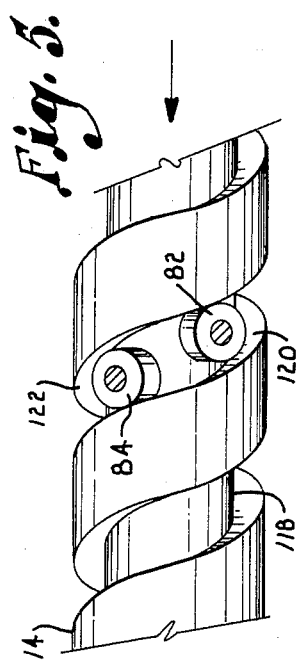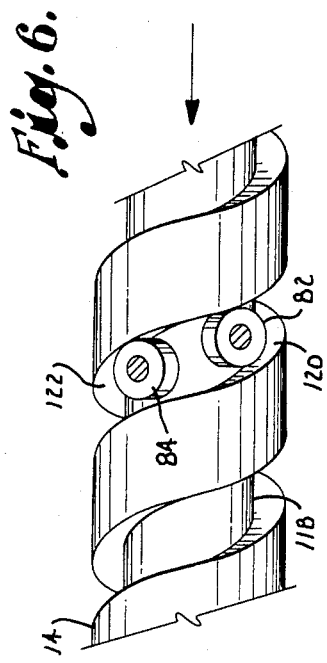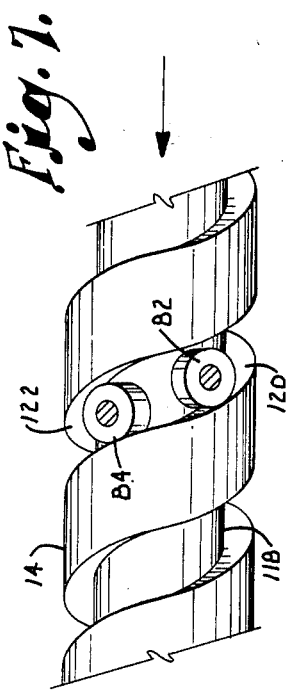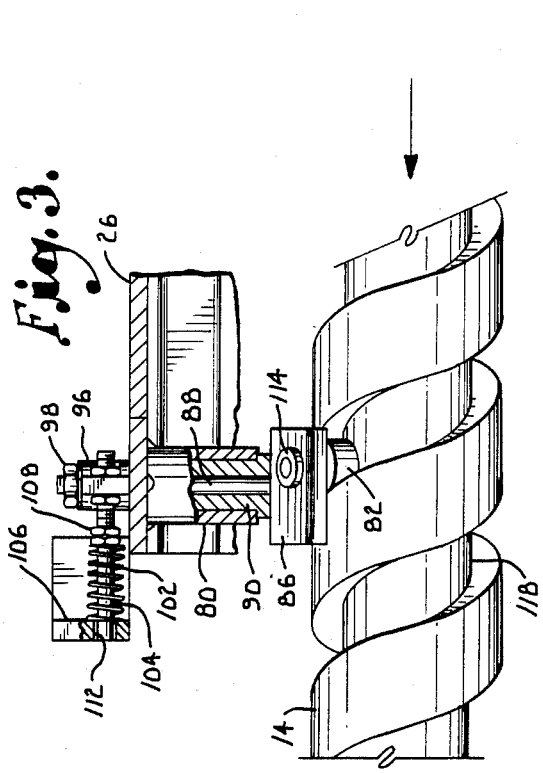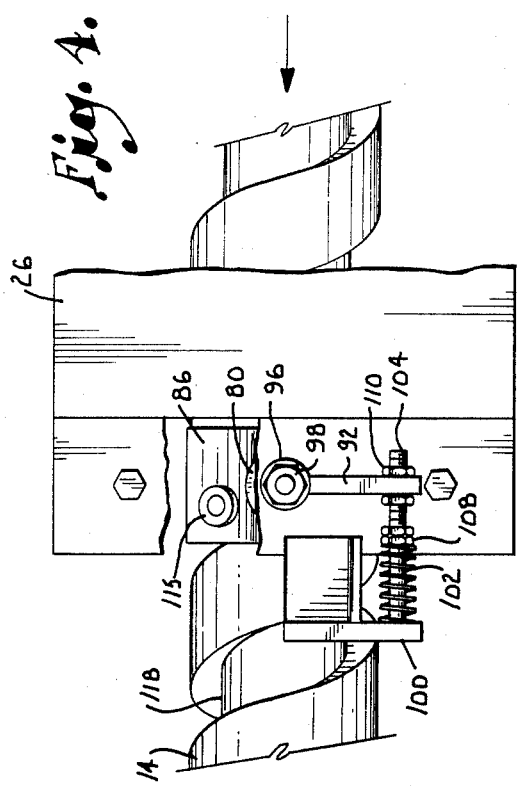

CAM FOLLOWER ASSEMBLY FOR INDEXING CONVEYORS

RELATED APPLICATION

U.S. patent application of Robert A. Hoehn, "INDEXING CONVEYOR FOR ROBOTIC PRODUCTION OPERATIONS," Ser. No. 393,428, filed June 29, 1982.

This invention relates to an improvement in high speed indexing conveyors of the type employing a helical drive shaft to propel a shuttle carriage to which the product, typically carried on a wheeled dolly, is coupled, and in particular to an improved drive connection between the carriage and the helical thread of the shaft that eliminates impact loading and assures precise positioning of the product-bearing dolly.

My above-referenced copending patent application discloses an indexing conveyor that is especially suited for robotic production operations and which employs a shuttle carriage that is propelled along the axis of a main drive shaft through the engagement of a pair of cam follower rollers, located beneath the shuttle carriage, with a helical groove in the circumference of the shaft. The shuttle carriage straddles the drive shaft and rides on a guide track having parallel track segments located on opposite sides of the drive shaft in parallelism with its axis of rotation. Rapid indexing is accomplished by controlling the rotational speed of a drive shaft having a uniformly helical thread or by the use of a variable helical drive shaft rotated at constant speed.

As discussed in my copending application, time is a critical factor in the operation of an indexing conveyor, particularly in applications in which a multiple section indexing conveyor is part of an integrated conveyor system that also employs moving chain conveyors for advancing products through manual work stations. Accordingly, it is a requirement that the indexing conveyor rapidly accelerate the product-bearing dolly after it is picked up by the shuttle carriage and then rapidly decelerate the intercoupled carriage and dolly to a final, stationary position at a work station. When robotic operations are to be performed, such positioning must be precise.

The diameters of the cam follower rollers are necessarily somewhat less than the width of the helical groove within which they are received. Thus, in a system designed to minimize the travel time required for indexing, the high acceleration and deceleration rates can create an impact loading condition in the drive connection between the shaft and the carriage effected by the follower rollers and the internal surfaces of the shaft against which they bear. Furthermore, precise positioning at a work station is difficult unless play in the drive connection is eliminated.

It is, therefore, the primary object of the present invention to provide an improved drive connection between the helical shaft and the shuttle carriage of an indexing conveyor of the type described, wherein impact loading in the drive connection is eliminated and precise positioning of the carriage at its final position is assured.

It is also an important object of this invention to provide a means of assuring that the load is shared between the two followers that form the aforesaid drive connection.

Another important object of the present invention is to provide a swivel connection between the two followers and the carriage wherein such connection mounts the followers for pivotal movement about an axis perpendicular to the axis of the drive shaft, and wherein yieldable means biases the followers in one direction about such pivotal axis in order to maintain the followers in engagement with the internal, leading and trailing surfaces respectively of the shaft within the helical groove when the shaft is at rest or rotating at constant speed.

A further and important object is to provide a biasing arrangement as aforesaid whereby under rapid acceleration or deceleration the followers pivot in the opposite direction against the action of the yieldable means to engage both followers with the trailing shaft surface during acceleration and the leading surface thereof during deceleration.

Other objects will become apparent as the detailed description proceeds.

DESCRIPTION OF THE DRAWINGS

FIG. 1 is a fragmentary, diagrammatic plan view of an indexing conveyor employing a helical drive shaft and a shuttle carriage.

FIG. 2 is a vertical cross section on a greatly enlarged scale taken along line 2—2 of FIG. 1, showing an end view of the shuttle carriage with certain parts being removed for clarity.

FIG. 3 is a fragmentary, side elevation taken along line 3—3 of FIG. 2, certain parts being broken away and revealed in section to reveal details of construction.

FIG. 4 is a plan view of the assembly seen in FIG. 3, with certain parts broken away.

FIGS. 5, 6 and 7 are fragmentary plan views of a portion of the drive shaft showing the follower rollers captured within the helical groove, the axle studs of the rollers being illustrated in cross section. FIG. 5 shows the position of the rollers when the shaft is at rest or rotating at a constant speed, FIG. 6 shows the positions of the rollers under rapid acceleration, and FIG. 7 shows the positions of the rollers under rapid deceleration.

DETAILED DESCRIPTION

One indexing section 10 of a multisection indexing conveyor is shown in full in FIG. 1 and comprises a shuttle carriage 12 that is propelled by a helical drive shaft 14 driven by a suitable prime mover and drive arrangement illustrated at 16. The drive shaft 14 is mounted between and in parallelism with the two rails of an elevated floor track 18 upon which wheeled, product-bearing dollies ride, such as a dolly 20 outlined in phantom lines in FIG. 1 on carriage 12. The dolly 20 is also illustrated in FIG. 2 where two of its casters 22 are shown rolling within the track 18, the latter being supported above floor level by spaced columns 24. The shuttle carriage 12 is being indexed to the left as viewed in FIG. 1 and is shown near midway in its path of travel from its home position at the right end of shaft 14 to an advanced, final position at the left end of shaft 14 where the dolly 20 will be positioned at a robotic work station (not shown).

A rear end view of the shuttle carriage 12 is seen in FIG. 2. An inverted U-shaped base member 26 has track rollers on both horizontal and vertical axes mounted thereon adjacent its lower edges and received within the parallel track segments 28 and 30 of a guide track upon which the shuttle carriage 12 rides. The drive shaft 14 is substantially centered between the track segments 28 and 30, and the support columns 24 for the dolly track 18 are spaced outboard from the shuttle carriage track as shown in FIG. 2. Two track rollers 32 on vertical axes and one horizontally disposed roller 34 in track segment 28 may be seen in FIG. 2, and a roller 36 turning on a horizontal axis is shown received in track segment 30.

The dolly 20 is provided with a transversely extending, depending striker bar 38 which provides a means by which the dolly 20 may be coupled to the shuttle carriage 12 for movement in unison therewith. This is accomplished by a pair of clamp arms 40 and 42 mounted atop the carriage 12 which are closed against the opposed, forwardly and rearwardly facing contact surfaces respectively of the striker bar 38. The clamp arms 40 and 42 and the operating mechanism therefor are fully disclosed in the copending U.S. patent application of Robert A. Hoehn and Thomas B. Doyle entitled "Clamping Device for High Speed Indexing," filed on even date herewith. A number of the components of such mechanism are seen in FIG. 2, including a camming ramp 44 on horizontal slide plate 46, a horizontal table 48 underlying plate 46, a vertical bar 50 depending from one apex of a triangular crank element 52 which is pivotally connected at its other apexes to the plate 46 and the table 48 respectively, and a pair of horizontal rails 54 and 56 mounted above the top of base member 26 and which carry the table 48. The rails 54, 56 provide a track for the table 48 extending in parallelism with the axis of the drive shaft 14, the table 48 being driven from one end of the rails 54, 56 to the other end and back during each advance and return of the shuttle carriage 12 as explained in the aforesaid Hoehn and Doyle application. Legs 58 of table 48 are shown in FIG. 2 provided with vertically and horizontally oriented rollers 60 that ride on track structure associated with the rails 54, 56. A lug 62 depending from table 48 connects the table with a drive chain (not shown) that engages a sprocket 64 on one end of a transverse shaft 66. The opposite, outer end of the shaft 66 is connected by reduction gearing 68 to a pinion 70 in mesh with a rack 72 that extends parallel to drive shaft 14 and is substantially coextensive therewith. Arms 74 on standards 76 spaced along shaft 14 and braced at 78 to the track 18 provide a rigid support for the rack 72.

As described in the aforesaid Hoehn and Doyle application, remotely mounted pneumatic cylinders (not shown) appropriately positioned at the home and final positions of the shuttle carriage 12 extend their piston rods into engagement with the bar 50 to swing the crank element 52 and thereby open or close the crank arms 40, 42 as appropriate by sliding the plate 46 to, in turn, either engage or disengage the camming ramps with the clamp arms. Accordingly, the dolly 20 illustrated in FIG. 2 may be rigidly coupled with the shuttle carriage 12 for movement in unison with the carriage 12 by the drive shaft 14 by closing the clamp arms 40, 42 against the striker bar 38.

A vertically depending sleeve 80 is welded to the underside of the horizontal portion of the base member 26 adjacent its front end and is transversely centered thereon such that the central axis of the sleeve 80 is perpendicular to the rotational axis (point 116) of the drive shaft 14. This is particularly apparent in FIG. 2 where it may also be seen that a pair of cam follower rollers 82 and 84 are mounted on a yoke-shaped swivel bar 86 that is rigidly secured to the lower end of a vertical shaft 88. Referring to FIGS. 3 and 4, a bushing 90 held in sleeve 80 by a press fit receives the vertical shaft 88, the upper end of which projects above base member 26 and is secured to an arm 92 that extends horizontally at right angles to the axis of the shaft 14. The inner end of the arm 92 is integral with a collar 96 that is pinned to shaft 88 and further secured by a nut 98.

An L-shaped bracket 100 is rigidly secured to the front end of the base 26 and projects forwardly and laterally therefrom to provide a mount for a coil spring 102 which is telescoped over a rod 104 connected to the outer end portion of arm 92. The spring 102 is held in compression between a rearwardly facing surface 106 of bracket 100 and a pair of nuts 108 on rod 104, the latter being threaded along at least that portion of its length projecting rearwardly from spring 102 to accommodate the nuts 108 and an additional pair of nuts 110 which secure rod 104 to arm 92. The arm 92 is apertured to receive rod 104, and the nuts 110 are turned tightly against the opposing surfaces of the arm to securely lock the rod 104 and the arm 92 together. A clearance opening 112 (FIG. 3) in bracket 100 is aligned with rod 104 and is of larger diameter than the rod to preclude interference between these two components.

As may be seen in FIG. 2, the yoke-shaped bar 86 has a horizontal center portion pinned at 113 to the lower end of the shaft 88, and two integral wings provided with collars 114 and 115 that receive the axle studs of the rollers 82 and 84 respectively. The wings are inclined from the horizontal at an angle of approximately 30° in order that the axes of rotation of the rollers 82 and 84 will intersect the axis of the drive shaft 14, such axis in FIG. 2 being perpendicular to the plane of the drawing and thus represented by the point 116. The shaft 14 has a uniform helical groove 118 of constant pitch in its circumferential periphery, both of the rollers 82 and 84 being received within the groove 118 as is clear in FIGS. 2 and 3.

The leftwardly directed arrows aligned with the drive shaft 14 in FIGS. 3–7 indicate the direction of forward movement of the shuttle carriage 12, and hence its base member 26, when the shaft 14 is rotating in a right hand sense or clockwise as viewed from its trailing end (looking in the direction of the arrows). FIGS. 5–7 show the follower rollers 82 and 84 in three positions within their zone of engagement with the shaft 14; FIG. 5 corresponds with FIG. 4 and shows the position of the rollers 82 and 84 when the shaft 14 is either at rest or rotating at constant speed, FIG. 6 shows the position of the rollers when the rotative speed of the shaft 14 is being rapidly increased to accelerate the forward movement of the shuttle carriage, and FIG. 7 shows the position of the rollers when the shaft speed is being rapidly decreased to decelerate the carriage to a stop. The reference numerals 120 and 122 in FIGS. 5–7 respectively designate the opposed, leading and trailing surfaces within the groove 118 presented by the shaft 14 at the zone of engagement of the rollers 82 and 84 therewith. In FIG. 5 roller 82 is shown bearing against the trailing surface 122 whereas roller 84 is bearing against the leading surface 120. This is the result of the action of the spring 102 which biases arm 92, and hence the shaft 88 and swivel bar 86, in a counter-clockwise direction as viewed in FIG. 4. It should be noted that the shaft 88 is coaxial with sleeve 80 and thus their common axis is perpendicular to the axis 116 of the shaft 14 (FIG. 2).

Under rapid acceleration the force of the spring 102 is overcome and the spring is further compressed, resulting in both rollers 82 and 84 being brought to bear against the trailing surface 122 as shown in FIG. 6. In this condition the force of the accelerating shaft has caused the rollers 82 and 84, and thus the arm 92, to pivot in a clockwise direction about the axis of shaft 88. This also occurs in response to deceleration as shown in FIG. 7, except that now the two rollers 82 and 84 both bear against the leading surface 120.

The force applied by the drive shaft 14 to the follower rollers 82 and 84 to accelerate or decelerate the load is given by F=ma, neglecting friction, where F = the applied force m = mass of the load (shuttle carriage and product-bearing dolly)

a = acceleration (+) or deceleration (−).

The compression of spring 102, therefore, is set such that the opposing force applied to the rollers 82 and 84 by the spring is intermediate the level of drive force applied by shaft 14 under conditions of no acceleration at constant maximum speed, and the increased force F applied during acceleration or deceleration. Accordingly, rapid acceleration and deceleration of the rotational speed of the shaft 14 produce the same effect and overcome the force of the spring 102 except that during deceleration both rollers 82 and 84 bear against the leading surface 120 (FIG. 7) rather than the trailing surface 122 (FIG. 6).

The pre-load on the rollers 82 and 84 thus imparted by the spring 102 prevents impact loading in the drive connection between the shaft 14 and the shuttle carriage 12 formed by the interengagement of the follower rollers 82 and 84 and the shaft 14. This eliminates the shock otherwise encountered in changing from full acceleration to full deceleration during product indexing, since a smooth transition from the FIG. 6 condition to the FIG. 5 condition and then to the FIG. 7 condition is achieved. Equal sharing of the load between the two follower rollers 82 and 84 is assured. Furthermore, precise positioning of the product-bearing dolly at a work station is guaranteed since the parts return to the at-rest condition of FIG. 5.

Having thus described the invention, what is claimed as new and desired to be secured by Letters Patent is:

1. In an indexing conveyor:
    a carriage adapted to be coupled to a product-bearing carrier,
    a drive shaft for advancing said carriage along a predetermined path of travel upon rotation of the shaft about its axis to thereby propel a carrier coupled to the carriage,
    said shaft having a helical groove in the circumference thereof, a pair of followers,
    means extending from said carriage and mounting said followers for pivotal movement about an axis substantially perpendicular to said axis of the drive shaft with said followers disposed on opposite sides of said perpendicular axis and received within said groove to define a zone of engagement of the followers with the shaft,
    said shaft presenting opposed, leading and trailing surfaces within said groove at said zone of engagement, and
    yieldable means coupled with said followers and biasing the same in one direction about said perpendicular axis to maintain the followers in engagement with said leading and trailing surfaces respectively when the shaft is at rest or propelling the carriage at constant speed, whereby under rapid acceleration or deceleration the followers pivot in the opposite direction against the action of said yieldable means to engage both followers with the trailing surface during acceleration and the leading surface during deceleration.

2. The apparatus as claimed in claim 1, wherein said yieldable means includes means for applying an opposing force to said followers, biasing the followers in said one direction, which is greater than the drive force applied by said shaft to said followers when the shaft is propelling the carriage at constant speed, but less than the force applied under said rapid acceleration or deceleration.

3. In an indexing conveyor:
    a carriage adapted to be coupled to a product-bearing carrier,
    a drive shaft for advancing said carriage along a predetermined path of travel upon rotation of the shaft about its axis to thereby propel a carrier coupled to the carriage,
    said shaft having a helical groove in the circumference thereof, a swivel member,
    means mounting said member on said carriage for pivotal movement about an axis substantially perpendicular to said axis of the drive shaft,
    a pair of followers carried by said member on opposite sides of said axis thereof and received within said groove to define a zone of engagement of the followers with the shaft,
    said shaft presenting opposed, leading and trailing surfaces within said groove at said zone of engagement, and yieldable means connected with said member and biasing the same in one direction about said axis of the member to maintain the followers in engagement with said leading and trailing surfaces respectively when the shaft is at rest or propelling the carriage at constant speed, whereby under rapid acceleration or deceleration the swivel member pivots in the opposite direction against the action of said yieldable means to engage both followers with the trailing surface during acceleration and the leading surface during deceleration.

4. The apparatus as claimed in claim 3, wherein said yieldable means includes means for applying an opposing force to said followers, biasing the swivel member and followers in said one direction, which is greater than the drive force applied by said shaft to said followers when the shaft is propelling the carriage at constant speed, but less than the force applied under said rapid acceleration or deceleration.

5. The apparatus as claimed in claim 4, wherein said mounting means includes a shaft presenting said axis of the member, and wherein said yieldable means includes spring means mounted on said carriage and coupled with said shaft for biasing the same in said one direction and effecting the application of said opposing force to said followers.

6. The apparatus as claimed in claim 4, wherein each of said followers comprises a roller received within said groove, and wherein said swivel member includes means mounting said rollers in transversely spaced relationship with respect to said axis of the drive shaft for rotation on respective axes thereof substantially intersecting said axis of the shaft.

* * * * *

UNITED STATES PATENT AND TRADEMARK OFFICE
CERTIFICATE OF CORRECTION

PATENT NO. : 4,567,979
DATED : February 4, 1986
INVENTOR(S) : ROBERT A. HOEHN

It is certified that error appears in the above—identified patent and that said Letters Patent is hereby corrected as shown below:

Column 5, line 52, a new paragraph should begin after the word "thereof,";

Column 6, line 33, a new paragraph should begin after the word "and".

Signed and Sealed this

Fifteenth Day of July 1986

[SEAL]

Attest:

Attesting Officer

DONALD J. QUIGG

Commissioner of Patents and Trademarks